May 12, 1925. 1,537,735
H. BECKER
DEVICE FOR REGULATING THE PRESSURE OF THE INJECTING AIR OF TWO-STROKE
INTERNAL COMBUSTION MARINE ENGINES PROVIDED WITH SCAVENGING PUMPS
Filed Jan. 6, 1923   2 Sheets-Sheet 1

Inventor:
Heinrich Becker,
By Knight Bros.
Atty

Patented May 12, 1925.

1,537,735

UNITED STATES PATENT OFFICE.

HEINRICH BECKER, OF KIEL-HASSEE, GERMANY, ASSIGNOR TO FRIED. KRUPP AKTIEN-GESELLSCHAFT GERMANIAWERFT, OF KIEL-GAARDEN, GERMANY.

DEVICE FOR REGULATING THE PRESSURE OF THE INJECTING AIR OF TWO-STROKE INTERNAL-COMBUSTION MARINE ENGINES PROVIDED WITH SCAVENGING PUMPS.

Application filed January 6, 1923. Serial No. 611,129.

*To all whom it may concern:*

Be it known that I, HEINRICH BECKER, residing at Kiel-Hassee, Germany, a citizen of the German Republic, have invented a certain new and useful Improvement in Devices for Regulating the Pressure of the Injecting Air of Two-Stroke Internal-Combustion Marine Engines Provided with Scavenging Pumps, of which the following is a specification.

This invention relates to a device for regulating the pressure of the injecting air of two stroke internal combustion marine engines provided with scavenging pumps.

It is already known with internal combustion engines to regulate the pressure of the air designed to inject the fuel into the cylinder in such a manner as to increase the pressure when the number of revolutions of the engine increases. It is further a well-known fact that the pressure of the scavenging air automatically increases at an increase of the number of revolutions of the engine, when the scavenging pump is coupled with the main engine.

The present invention has for its object to utilize the pressure of the scavenging air altering in accordance with the varying number of revolutions of the engine for automatically regulating the pressure of the injecting air in correspondence to the number of revolutions.

Figure 1:
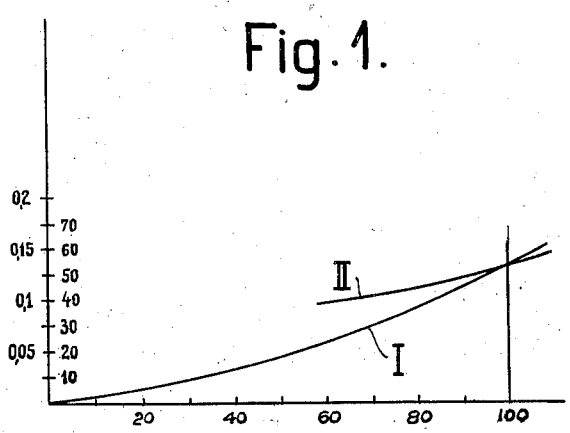
Fig. 1 is a graphical representation containing curves of the pressures of the scavenging and injecting air.

Referring first to Fig. 1 of the drawing, I denotes the curve of the varying pressure of the scavenging air and II denotes the curve of the necessary injecting pressure, the abscissæ of the curves corresponding to the numbers of revolutions per minute of the engine. The pressure is recorded in kg/cm². The low pressure-values entered at the left of the axis of ordinates indicate the ordinates belonging to the lower curve I of the pressure of the scavenging air which curve rises more strongly than the curve II, while the higher pressure-values which are entered at the right of the said axis belong to the curve II of the pressure of the injecting air. As will be seen from this figure the law of the requisite variability of the pressure of the injecting air deviates from the given variability of the pressure of the scavenging air.

Figure 2:
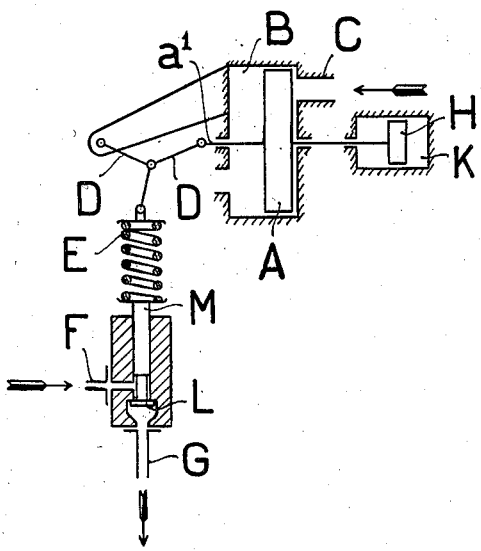
Fig. 2 is a diagrammatic view of an embodiment of the subject matter of the invention.
Figure 3:
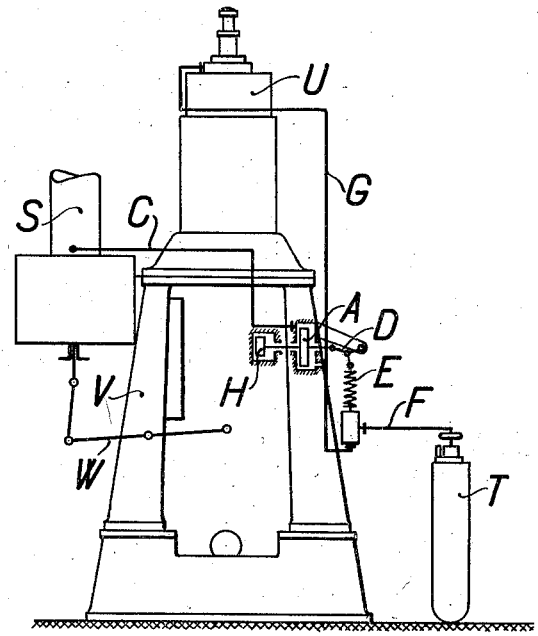
Fig. 3 shows an internal combustion engine in connection with the device according to Fig. 2.

The device which is diagrammaticaly illustrated in Fig. 2, and Fig. 3 allows an automatic regulation of the injecting pressure in dependence upon the pressure of the scavenging air. In these figures, A represents a piston movable to and fro in a cylindrical casing B, the right side of the piston being constantly under the influence of the pressure of the scavenging air generated in the pump S through the intermediary of a conduit C, while its left side is balanced. The piston rod $a^1$ which extends outwardly beyond the left end of the casing, is in mechanical connection with the spindle M of the injecting pressure regulating valve L through the intermediary of a toggle lever D and a spring E, while the piston rod which extends through the right end of the casing B carries a small piston H which acts as a fluid brake together with an oil-filled casing K. The introduction of the injecting air from the compressed air container T into the casing of the regulating valve L takes place by a conduit F and it is fed to the working cylinder by a conduit G. The scavenging pump S is attached to the frame V of the internal combustion engine and is actuated in known manner through a lever W from the cross head (not shown) of the machine.

The operation of the device will be readily understood, and it will, more particularly, be seen from Fig. 2 that the ratio of the the movement of the piston A to the movement of the valve L regulating the injecting pressure is continuously submitted to a change through the toggle lever transmission. As a consequence of this change of the ratio of movement of the two parts, the ratio between the pressure of the scavenging air and the pressure of the injecting air will, at an increase of the number of revolutions, increase too as required by the pressure curves illustrated in Fig. 1.

Figure 4:
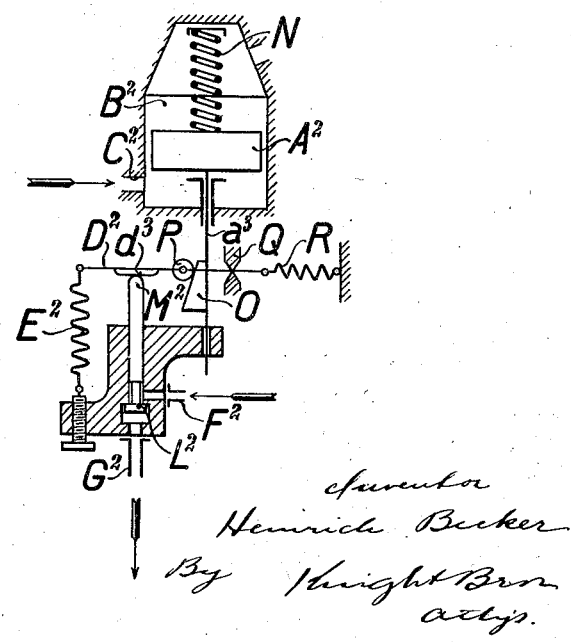
Fig. 4 shows schematically a second structural form of the invention.

In Fig. 4 a constructional form is shown in which instead of the toggle lever transmission a cam drive is used.

The piston $A^2$ is movable in the casing $B^2$, which is in connection with the atmosphere above the piston, while below the piston a passage $C^2$ leading from the scavenging pump opens. A spring N is in connection with the top of the piston. The piston rod $a^3$, which protrudes from the under side of the casing, carries a slide cam O on which a roller P runs, said roller being journaled in a rod $D^2$. The rod $D^2$ is pivoted at Q and is longitudinally displaceable and has at its one end a spring R which holds the roller P in constant contact with the cam. A spring $E^2$ is attached to the other end of the rod and the guideway $d^3$ provided on the rod presses down on the valve spindle $M^2$. The spring $E^2$ is fastened at its other end to a set screw so that its strength can be regulated. The injecting air, as above, is conducted into the casing of the regulating valve $L^2$ by means of passage $F^2$ and from there through the passage $G^2$ into the working cylinder.

The manner in which the scavenging air affects the piston $A^2$ is the same as described above. If the pressure of the scavenging air rises, the piston moves upwardly and thereby displaces by means of the cam O the roller P so that the rod $D^2$ moves to the left. In this manner the length of the rod from the bearing Q and the end to which spring $E^2$ is fastened is increased and thereby the spring exercises a greater force on the valve spindle.

By means of this arrangement, as in the arrangement according to Fig. 2, it is achieved that the relation between the scavenging air pressure and the injecting air pressure becomes greater as the number of revolutions increases. It is thus possible to influence the transmission relation in any desired manner by giving the correct form to the curve of the cam.

Claims.

1. In combination with a Diesel engine having scavenging-air and injecting-air devices, a valve for regulating the pressure of the injecting air, a piston influenced by the pressure of the scavenging air, and mechanical transmission means between said piston and said valve for transmitting the movement of said piston to said valve in varying ratio.

2. In combination with a Diesel engine having scavenging-air and injecting-air devices, a valve for regulating the pressure of the injecting air, a piston influenced by the pressure of the scavenging air, and mechanical transmission means between said piston and said valve for transmitting the movement of said piston to said valve in varying ratio, the pressure of the scavenging air being in direct proportion to the speed of the engine.

3. In combination with a Diesel engine having scavenging-air and injecting-air devices, a valve for regulating the pressure of the injecting air, a piston under the influence of the scavenging air, and a toggle lever transmission unit between said piston and said valve whereby the movement of said valve is controlled in variable ratio to the movement of said piston.

4. In combination with a Diesel engine having scavenging-air and injecting-air devices, a valve for regulating the pressure of the injecting air, a reciprocable valve stem for controlling said valve, a piston under the influence of the scavenging air, jointed toggle levers, said piston being connected to said toggle levers at their joint, the other ends of said levers being pivoted respectively to said valve stem and to a fixed point of attachment, whereby the movement of said valve is controlled in varying ratio to the movement of said piston.

HEINRICH BECKER.